Figure 1:
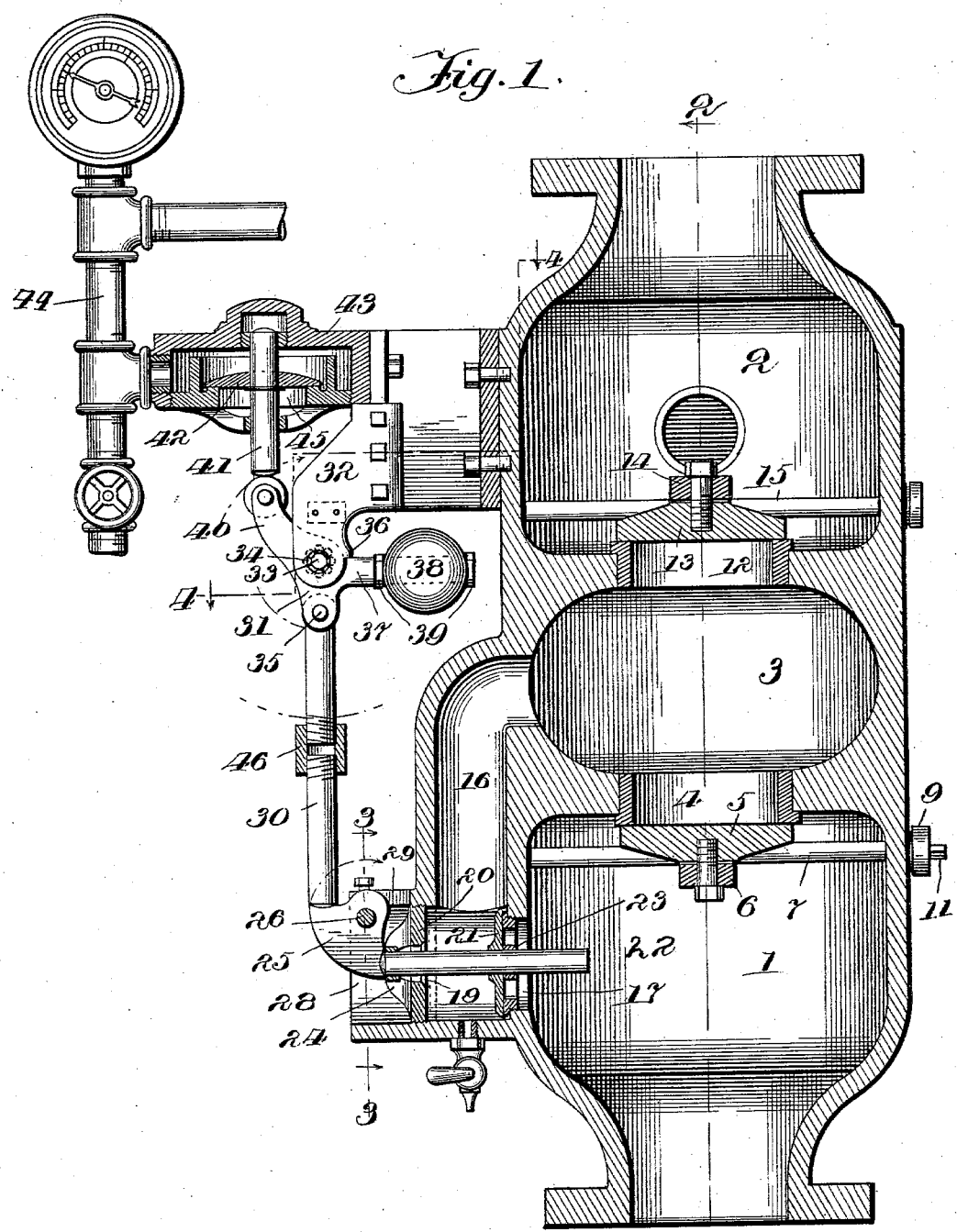

No. 752,969. PATENTED FEB. 23, 1904.
W. A. GOLDTHWAIT.
VALVE FOR AUTOMATIC FIRE EXTINGUISHERS.
APPLICATION FILED MAR. 2, 1903.
NO MODEL. 2 SHEETS—SHEET 1.

Witnesses:
H. S. Gaither
H. M. McDowell

Inventor:
William A. Goldthwait
by L. W. Hopkins
Attorney.

No. 752,969. PATENTED FEB. 23, 1904.
W. A. GOLDTHWAIT.
VALVE FOR AUTOMATIC FIRE EXTINGUISHERS.
APPLICATION FILED MAR. 2, 1903.
NO MODEL. 2 SHEETS—SHEET 2.
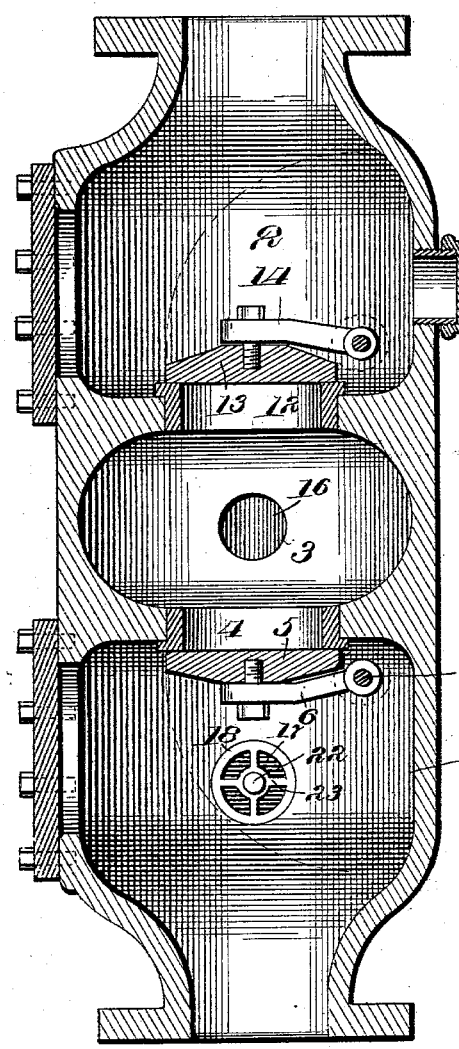
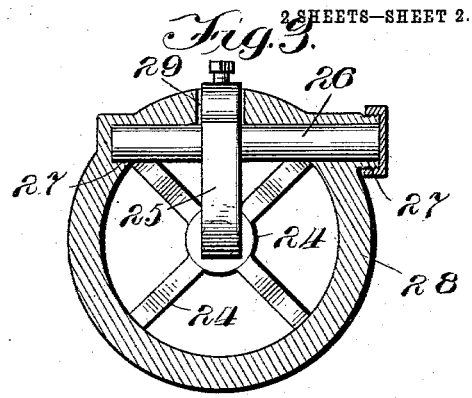
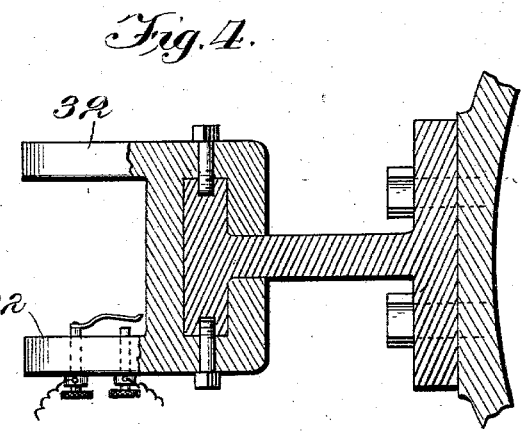
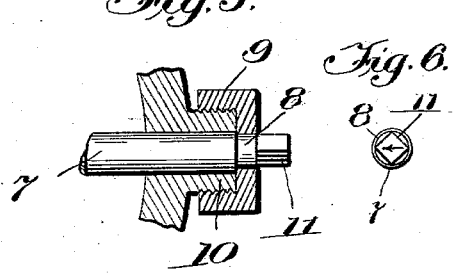

No. 752,969. Patented February 23, 1904.

UNITED STATES PATENT OFFICE.

WILLIAM A. GOLDTHWAIT, OF MELROSE PARK, ILLINOIS.

VALVE FOR AUTOMATIC FIRE-EXTINGUISHERS.

SPECIFICATION forming part of Letters Patent No. 752,969, dated February 23, 1904.

Application filed March 2, 1903. Serial No. 145,821. (No model.)

*To all whom it may concern:*

Be it known that I, WILLIAM A. GOLDTHWAIT, a citizen of the United States, residing at Melrose Park, in the county of Cook and State of Illinois, have invented certain new and useful Improvements in Valves for Automatic Fire-Extinguishers, of which the following is a specification.

The present invention relates to the main valve of an automatic fire-extinguisher of the dry-pipe sprinkler type.

The principal object of the invention is to hold a water-controlling valve firmly and positively seated, so that no amount of pressure against it, whether the effect of water-hammer or other cause, can possibly unseat it, even slightly and momentarily. To this end I incorporate in the valve-holding device a toggle, one end of which receives the pressure from the water-valve and the other end of which bears against a fixed abutment, and I provide means controlled by the pressure of the air in the system for normally holding the joint of the toggle on the dead-center.
Another object of the invention is to hold the water-valve seated by the direct pressure of the water against it instead of through the medium of a second valve of larger area. To this end the main water-valve is arranged to seat with the pressure and close a port opening into a low-pressure chamber, which is connected with the water-chamber by a by-pass controlled by a valve seating against the water-pressure and normally held seated by the pressure of the air in the system.

Another object of the invention is to provide a direct and wholly unobstructed course for the water, and to this end I mount the main water-valve to swing from a center at one side of the main port, so that when relieved of the pressure of the water it will swing downward by gravity to a position wholly out of the watercourse, and I mount the main air-valve similarly, excepting that it swings upward under the influence of the inrushing water.

Other objects of the invention will appear hereinafter.

The invention consists in the features of novelty that are herein described with reference to the accompanying drawings, which are made a part of this specification, and in which—

Figure 1 is a view, partly in vertical section and partly in elevation, of a valve embodying the invention. Fig. 2 is a vertical section thereof on a smaller scale, the plane of the section being indicated by the line 2 2, Fig. 1. Figs. 3 and 4 are sections or portions thereof on the lines 3 3 and 4 4, respectively, Fig. 1. Fig. 5 is a section thereof. Fig. 6 is a detail.

The main valve has a water-chamber 1, which is in communication with the water-supply, an air-chamber 2, in communication with the riser of the system, and an intermediate chamber 3, (hereinafter called the "low-pressure chamber,") which is normally maintained at atmospheric pressure in the manner hereinafter described. The water-chamber communicates with the low-pressure chamber through a port 4, which is controlled by a valve 5, hereinafter called the "main water-valve." This valve is arranged to seat with the pressure of the water and is carried by an arm 6, non-rotatively secured to a shaft 7, mounted to turn in ground bearings in the walls of the chamber. As shown in Fig. 5, one end of the shaft passes completely through the wall of the chamber and has a reduced portion 8, which passes through a cap 9, having threaded engagement with a spud 10 on the outside of said wall. The cap engages the shoulder resulting from the reduction and prevents the endwise movement of the shaft. The projecting end 11 of the shaft is squared to receive a wrench for holding the valve on its seat while the system is being charged with compressed air. The extremity of the shaft is provided with an arrow, as shown in Fig. 6, or other mark for showing the position of the valve. It will be seen that so long as the pressure of the water against the under side of the valve exceeds the pressure in the low-pressure chamber plus the weight of the valve itself the valve will be held to its seat and no amount of water-pressure or water-hammer can unseat it and that when the water-pressure against its under side falls below that above indicated the valve will fall away by gravity, swinging about the center of the shaft 7. This shaft being located a considerable distance from the port and the chamber being of sufficient lateral extent to receive it, a wholly-unobstructed waterway of full capacity will be provided.

The air-chamber 2 communicates with the low-pressure chamber through a port 12, controlled by a valve 13, carried by an arm 14, which is non-rotatively secured to a shaft 15, mounted to turn in ground bearings in the walls of the chamber. This valve seats with the air-pressure and is held seated thereby until by reason of a reduction of said air-pressure to a predetermined extent the main water-valve unseats and admits water to the low-pressure chamber. Thereupon the valve will be swung upward and to one side, leaving the watercourse wholly unobstructed. I am aware that a main air-valve of this construction and mode of operation is not new *per se*. The low-pressure chamber may be put in communication with the water-chamber through a by-pass 16, the lower end of which takes the form of a port 17, opening from the water-chamber and surrounded by a valve-seat 18; but said low-pressure chamber is normally in communication with the atmosphere through said by-pass and a port 19, surrounded by a valve-seat 20. Both of these ports are controlled by a double-faced valve 21, (hereinafter called the "auxiliary water-valve,") which in turn is controlled by the pressure of the air in the system through the medium of suitable intervening mechanism. While closing the port 17 the valve seats against the water-pressure, and while closing the port 20 it seats with the water-pressure. It is carried by a horizontal stem 22, which is slidably supported by the spiders 23 and 24. Its outer end engages a part 25, which is non-rotatively secured to a shaft 26, mounted to turn in bearings 27, supported by a tubular bracket 28, projecting horizontally from the lower end of the by-pass. This part 25 is of quadrant shape substantially and has two faces that are at right angles to each other. It is in effect and in fact a bell-crank lever, its two right-angle faces being the equivalents of the two arms of a bell-crank lever, and it will be so considered hereinafter. The shaft 26 is located near the top of the tubular bracket, and in order to permit the bell-crank lever to swing the top of the bracket is provided with a slot 29. The horizontal arm of the bell-crank lever is engaged by the lower end of the lower member 30 of a toggle, the upper member 31 of which bears against a fixed abutment. As here shown, the abutment is in the form of a pair of brackets 32 and the member 31 bears against it through the medium of a short shaft 33, to which the member 31 is non-rotatively fixed, and antifriction-balls 34; but these details are not essential. The joint through which the two members react is here shown as consisting of a pin 35, occupying perforations in their overlapping ends; but this is not essential. For limiting the movement of the members in one direction and arresting them when the joint is precisely on the dead-center a stop 36 is arranged to engage the member 31. For moving them in the opposite direction to break the joint the member 31 is provided on one side of its center of motion with a laterally-projecting arm 37, on which a weight 38 is adjustably mounted, nuts 39 being turned onto the arm on opposite sides of the weight for holding it to its adjustment. For holding the members in opposition to the weight with their joint on the dead-center an arm 40 projects from the opposite side of the member 31 and is engaged by the stem 41 of a valve 42, (hereinafter called the "auxiliary air-valve.") This valve is contained in a casing 43, which communicates with the distributing system through a pipe 44 and which has a port 45 opening to atmosphere and controlled by the valve. The member 30 of the toggle is preferably made in two parts, having right and left threads, and coupled by a union 46, having corresponding threads, so that it can be adjusted in length for the purpose of forcing the auxiliary water-valve to its seat with any desired pressure. It will be seen that by reason of the alinement of the three bearing-points of the toggle none of the endwise strain upon it is transmitted to the auxiliary air-valve, and hence I am enabled to regulate to a nicety the conditions under which the air-pressure becomes ineffective in holding the water-valve seated. Ordinarily dry-pipe systems are charged with air under about forty pounds and the valve is conditioned to release upon a reduction of the pressure to fifteen pounds; but with valves at present in use the releasing-point varies very materially; but in the device above described the weight bears an absolutely fixed and invariable relation to the air-pressure, and since neither is influenced in the least by the water-pressure it follows that the releasing-point may be fixed with accuracy.

What I claim as new is—

1. In a device of the class described, the combination with a casing having a water-chamber, a low-pressure chamber, and a port connecting them, of a main water-valve located in the water-chamber and arranged to seat upward, with the water-pressure, for closing said port, a by-pass connecting the two chambers, a valve for controlling said by-pass, and means controlled by the pressure of the air in the system for holding it normally seated, substantially as described.

2. In a device of the class described, the combination with a casing having a water-chamber, a low-pressure chamber, and a port connecting them, of a main water-valve located in the water-chamber and arranged to seat upward, with the water-pressure, for closing said port, an arm carrying said valve and mounted to swing from a point at one side of said port, a by-pass connecting the two chambers, a valve for controlling said by-pass, and means controlled by the pressure of the air in the system for controlling said valve, substantially as described.

3. In a device of the class described, the combination with a casing having a water-chamber, a low-pressure chamber, and a port connecting them, of a main water-valve located in the water-chamber and arranged to seat upward, with the water-pressure, for closing said port, a by-pass connecting the two chambers and terminating at its lower end in a port opening from the water-chamber, said by-pass having a second port, opposite the port aforesaid, opening to atmosphere, a double-faced valve for controlling said ports, and means controlled by the pressure in the system for controlling said valve, substantially as described.

4. In a device of the class described, the combination with a casing having a water-chamber, a low-pressure chamber and a port connecting them, of a valve for controlling said port, a by-pass connecting the chambers, a valve for controlling said by-pass, means interposed between said valve and a fixed abutment for holding said valve seated, said means including a toggle, a stop for arresting the movement of the toggle members in one direction when the joint reaches the dead-center and means controlled by the pressure in the system for holding said joint on the dead-center, substantially as described.

5. In a device of the class described, the combination with a casing having a water-chamber, a low-pressure chamber and a port connecting them, of a valve for controlling said port, a by-pass connecting the chambers, a valve for controlling said by-pass, means interposed between said valve and a fixed abutment for holding the valve seated, said means including a toggle, a stop for arresting the movement of the toggle members in one direction when the joint reaches the dead-center, means controlled by the pressure in the system for holding said joint on the dead-center, and means for breaking the joint upon a predetermined reduction of the pressure in the system, substantially as described.

6. In a device of the class described, the combination with a casing having a water-chamber, a low-pressure chamber and a port connecting them, of a valve for controlling said port, a by-pass connecting the chambers, a valve for controlling said by-pass, means interposed between said valve and a fixed abutment for holding the valve seated, said means including a toggle, a stop for arresting the movement of the members of the toggle in one direction when the joint reaches the dead-center, means controlled by the pressure in the system for holding said joint on the dead-center, and means including a weight for breaking the joint upon a reduction of the pressure, substantially as described.

7. In a device of the class described, the combination with a casing having a water-chamber and a port leading therefrom, of a valve for controlling said port, means interposed between said valve and a fixed abutment for holding the valve seated, said means including a toggle an arm projecting from one side of one member of the toggle, a weight carried by said arm, an arm projecting from the opposite side of said member, and means controlled by the pressure in the system and engaging the arm last aforesaid for resisting the influence of the weight, substantially as described.

8. In a device of the class described, the combination with the casing having a water-chamber, a low-pressure chamber, and a port connecting them, of a main water-valve located in the water-chamber and seating with the pressure, a by-pass connecting the chambers, a valve for controlling said by-pass, means interposed between said valve and a fixed abutment for controlling said valve, said means including a toggle, and means controlled by the pressure in the system for controlling the toggle, substantially as described.

9. In a device of the class described, the combination with the casing having a water-chamber, a low-pressure chamber, and a port connecting them, of a valve located in the water-chamber and seating with the pressure for controlling said port, a by-pass connecting the chambers and terminating at its lower end in a port opening from the water-chamber, an auxilary water-valve closing said port against the pressure, a horizontal stem carrying the auxilary water-valve, a bell-crank lever one arm of which is engaged by said stem, a toggle interposed between the other arm of said lever and a fixed abutment, and means controlled by the pressure in the system for controlling the toggle, substantially as described.

10. In a device of the class described the combination with a casing having a water-chamber, a low-pressure chamber, an air-chamber, and ports connecting them, of a main water-valve located in the water-chamber and seating with the water-pressure to close the port to the low-pressure chamber, a main air-valve located in the air-chamber and seating with the air-pressure to close the port into the low-pressure chamber, a by-pass connecting the low-pressure chamber and water-chamber and terminating at its lower end in a port opening from the water-chamber, an auxiliary water-valve seating against the water-pressure to close the port last aforesaid, means interposed between the auxiliary water-valve and a fixed abutment for holding said valve seated, said means including a toggle, an auxiliary air-valve, and means interposed between said auxiliary air-valve and toggle for controlling the latter, substantially as described.

WILLIAM A. GOLDTHWAIT.

Witnesses:
H. M. McDonell,
L. M. Hopkins.